United States Patent [19]

Sawyer

[11] Patent Number: 5,321,772

[45] Date of Patent: Jun. 14, 1994

[54] DIGITAL IMAGE PROCESSOR

[75] Inventor: Darrell D. Sawyer, Bloomington, Minn.

[73] Assignee: Honeywell Inc., Minneapolis, Minn.

[21] Appl. No.: 645,210

[22] Filed: Jan. 24, 1991

Related U.S. Application Data

[63] Continuation of Ser. No. 488,260, Mar. 5, 1990, abandoned.

[51] Int. Cl.$^5$ .............................. G06K 9/62
[52] U.S. Cl. ..................... 382/30; 382/10; 382/33; 382/34
[58] Field of Search .................. 382/10, 30, 33, 34

[56] References Cited

U.S. PATENT DOCUMENTS

| | | |
|---|---|---|
| 3,576,334 | 4/1971 | Steinberger . |
| 4,244,029 | 1/1981 | Hogan et al. . |
| 4,380,391 | 6/1981 | Buser et al. . |
| 4,435,835 | 4/1982 | Sakow et al. . |
| 4,441,165 | 5/1982 | Coleman et al. . |
| 4,470,048 | 8/1982 | Short, III . |
| 4,490,851 | 9/1982 | Gerhart et al. . |
| 4,513,440 | 4/1983 | Delman . |
| 4,567,610 | 6/1983 | McConnell . |

Primary Examiner—Michael Razavi
Attorney, Agent, or Firm—Donald J. Lenkszus

[57] ABSTRACT

A digital image processor is described in which the output from a linear array of electro-optic sensors, first having been signal conditioned and digitized, is then loaded into a RAM image memory forming a part of the microprocessor-based template matching processor. The image memory functions like a shift device and as the sensor image signals are shifted therethrough, they are compared on a bit-by-bit basis with digital signals stored in a PROM which comprise a plurality of templates with which the scanned image is to be compared. The extent of correspondence between the image being sensed and the templates is then accumulated and if the sum exceeds a predetermined threshold, a match between the image being sensed and the template is established. The system is implemented using gate array technology such that the common template concept is feasible in those applications requiring very small size and low power dissipation.

8 Claims, 4 Drawing Sheets

DIGITAL IMAGE PROCESSOR

U.S. GOVERNMENTAL RIGHTS

The U.S. Government has contributed to the design and development of this invention and, therefore, has obtained certain rights therein.

This is a continuation of copending application Ser. No. 07/488,260, filed on Mar. 5, 1990 and now abandoned.

BACKGROUND OF THE INVENTION

Imaging sensor systems are routinely employed in military applications to provide information used in surveillance or in the guidance of a weapon system to a particular target. Such systems typically employ a scanning electro-optic sensor sensitive to certain portions of the electromagnetic spectrum. Such sensors are thus able to discriminate the emitted radiation of various target features in the sensor field-of-view.

A common prior art electro-optic sensor employs a linear array of infrared sensors. The linear array is combined with imaging optics and a scanning mirror such that it can be swept through a specific angle representing a field-of-view while the electrical output of each detector element is sampled at discrete intervals to form a set of "M" samples. In this manner, the field-of-view is quantized into a set of samples comprising N-rows by M-columns. It is the task of the image processor to analyze each set of input data, to determine if a particular object is present in the field-of-view and, if present, to determine, in effect, its coordinate location. Although a variety of techniques for such processing has been proposed and practiced, the most effective and widely used is to employ what is known as template matching.

In this arrangement, features of the object or objects of interest are stored as a digital template and are systematically compared to the input data from the sensor array. This is a very demanding and computationally intensive task in that to perform the template match, the template must be shifted for each condition of variability which may exist in the field-of-view. At a minimum, the template must be translated for all possible X-Y coordinate conditions that it might be found in the field-of-view. Additionally, the template may also have to be tested for various values of size commensurate with various ranges from the sensor to the object. Further, if the rotational position of the object is unknown, the template must be varied for all conditions of rotational orientation.

Although template matching algorithms have been extensively developed for implementation in general purpose programmable computers, such implementations are typically not practical for real-time, low-cost, low-power and very small size systems which could be deployed in a weapon guidance system, for example.

OBJECTS

It is the object of this invention to provide a high speed real-time image processing system capable of identifying and localizing a predefined object or objects in the field-of-view of a scanning electro-optical sensor.

Another object of the invention is to provide an image processor system in which parallel channel processing is utilized to increase the response to the point where a template matching algorithm can be utilized.

Still another object of the invention is to provide an image processing system implemented with conventional CMOS or other IC devices whereby low-power consumption and less of a heat dissipation problems is involved.

Yet another object of the invention is to provide an image processing system utilizing a microprocessor-based controller for directing the operation of plural template matching processors can be achieved.

SUMMARY OF THE INVENTION

In accordance with the present invention, a plurality of template matching processors are configured to analyze the outputs of a corresponding plurality of steerable sensor arrays whereby a real-time template matching algorithm allows processing of digital patterns in essentially parallel fashion. The template matching processors are under the control of a single microprocessor-based controller and digitized image data are shifted through an image memory forming a part of the template matching processor and a comparison is made between the image data and predetermined threshold limits stored in the template matching processors. The template matching test is performed by computing the logical AND of each bit of the image memory of the template matching processor with a corresponding bit of the stored templates and for all possible combinations of template positioning. The summation of the logical ANDs over the entire image memory space provides a count indicative of the degree of match. Means are also provided for establishing a threshold count so that if the summation exceeds the established threshold, the object being scanned is considered to be a match to the template.

The template matching algorithm is accomplished in a template matching processor which can be implemented at low cost and power in one primary and one support integrated circuit. The template matching microprocessor controller off-loads the computationally intensive tasks such that the image processing controller can process the template matching algorithm in very high speed real-time applications using a minimum of parts such that it is now possible for the first time to package in a very limited volume all the elements of the template matching algorithm.

DESCRIPTION OF THE DRAWINGS

FIG. 3b shows a timing diagram of certain of the timing control signals of FIG. 3a.

DESCRIPTION OF THE PREFERRED EMBODIMENT

Figure 1:
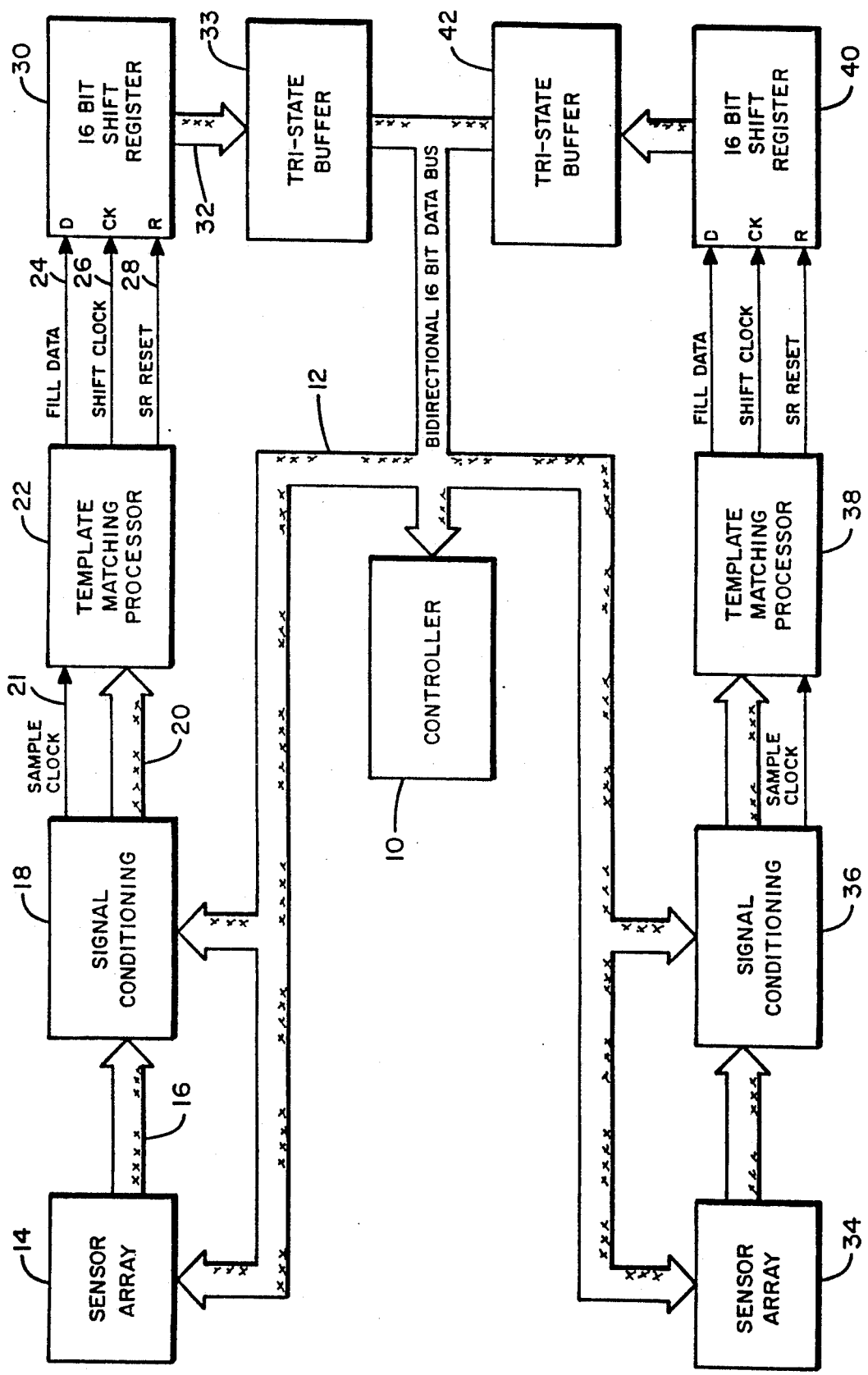
FIG. 1 shows a system block diagram of the complete image processing system of the present invention.

Referring to FIG. 1, the entire image processing task is performed by or under the control of controller 10. Controller 10 comprises a microcomputer which includes a microprocessor, preferably a 16-bit processor such as the Motorola 68000 and a read-only memory (ROM) for program storage, a random access memory (RAM) for variable storage, a timer and interrupt and input/output circuitry to communicate the processed results between other parts of a control system in which the microcomputer 10 is used. Since this invention is concerned only with the process of obtaining target identification and location information, the manner in which such resulting data is communicated to other elements is not shown. A bidirectional, 16-bit data bus 12 functions to provide the communications path for data and control signals.

Sensor array 14 is coupled to the bus 12 and may be a conventional prior art electro-optic infrared sensor which can be swept through a field-of-view. This field-of-view is a subsection of the total field of observation. The parameters which identify the instantaneous field-of-view are provided by controller 10, via the bidirectional 16-bit data bus 12. The output of the sensor array 14 is a set of signal lines 16, there being one signal line for the analog output of each of the aforementioned detector array elements of the linear detector array.

Signal conditioning circuitry 18 receives these analog outputs and provides for the quantization of each of the analog signals out of the sensor array in both time and amplitude. The sampled frequency chosen for time quantization establishes the X pixel interval, i.e., the pixel interval along the path of the scan line of the sensor array. Amplitude quantization is accomplished by means of a programmable reference threshold for each sample interval. The peak amplitude is compared to this reference value and the output is digitized to the value of "1" if it is above the amplitude and to "0" if it is below the amplitude. The amplitude reference level is chosen to optimally discriminate the objects of interest from background clutter. Both the sample frequency and the amplitude reference threshold may be programmable and under the control of controller 10, via the bidirectional 16-bit data bus 12. The signal conditioning outputs on bus 20 are thus the quantized digital values of the analog input signals on bus 16. This digitized image data is then presented to a template matching processor 22 in columnwise order, wherein each pixel in a column corresponds to one element of the linear sensor array. In this particular embodiment, a 16-element sensor array is assumed. As the sensor array is swept through the field-of-view, each sample interval presents a new column of image data to the input of the template matching processor 22.

The digital image data appearing sequentially on inputs 20 are shifted through an image memory (not shown) contained in the template matching processor. This is 16 bits (pixels) high and 8 bits (pixels) wide.

The image memory is analogous to the lighted display on the New York Times Building in Time Square, in which lighted images are shifted from left to right through a fixed display window, each light on the display corresponding to a specific bit in the X-Y image memory plane. Template matching processor 22 also contains a plurality of predefined digital templates representing the ideal object that is to be identified. The set of multiple templates may be representative of plural objects to be detected, but more typically relate to the same object with the variations accounting for differences in size or rotational orientation. In describing the invention, sixteen templates are assumed to have been chosen to represent one object at sixteen different ranges (sizes).

To most effectively discriminate objects, each template must be tested against the sensor image in every possible combination of X and Y translation. All possibilities of X axis translation are accounted for by performing the entire template matching algorithm for each of the sixteen templates and for each sample interval, i.e., each time a new column of pixels is shifted into the template matching image memory. All possibilities of Y axis translation is accounted for by performing the template matching test for all of the sixteen possible relative positions between the sensor image and each template threshold.

The template matching test is performed by computing the logical AND of each bit of the template matching processor image memory with its corresponding bit of the stored template threshold. The summation of these logical ANDs over the entire image memory space results in a digital count indicative of the number of pixels in which the template and the image are the same, e.g., both "1". To better explain the operation, consider the example of a stored template having a pattern of twenty pixels, all set to the value "1". An ideal or perfect match between the image memory and the template memory would result in a count of twenty. In the real world, error sources, such as quantization error, distortion and noise, generally preclude an ideal match. Therefore, for each template, a threshold count, equal to a predefined percentage of the ideal count, is established. The object is considered to match the template whenever the count resulting from the template test exceeds this threshold count.

For each template test, the results of the comparison with the template are provided on Fill Data line 24 and that result is shifted into the 16-bit shift register 30 by shift clock pulses on line 26. When, for a given sample, one template has been tested in each of the sixteen possible vertical positions, the contents of 16-bit shift register 30 are indicative of the vertical positions which satisfy the match threshold criteria for that template.

The output of shift register 30 is provided to microprocessor based controller 10, via tri-state buffer 33 and bidirectional data bus 12. This transfer may be effected by either of two well-known techniques, i.e., the controller may poll the state of shift register 30 periodically in synchrony with the sampling in image scanning steps or, alternatively, an interrupt to controller 10 may be generated when the assembly of data in the 16-bit shift register is complete. Controller 10 determines that an object has been found by detecting the presence of one or more "1's" in the 16-bit shift register. The vertical position of the object in the image memory plane is established by the bit position of these "1's" in shift register 30 while the X position of the object is established by the instantaneous value of the sample count when such a detection is made.

It can thus be seen that the time required for microprocessor-based controller 10 to detect and localize an object in the field-of-view is substantially reduced by the preprocessing performed by the template matching processor 22. In fact, given the extensive preprocessing accomplished by the template matching processor 22, it is practical for a single microprocessor-based controller 10 to control a multiplicity of sensor arrays.

In this regard, elements 34 through 42 depict a second sensor array and associated signal conditioning and template matching processor which shares a common controller and data bus on a time multiplexed basis. While only two are illustrated, a greater number of such sensor arrays can be effectively used to extend the field of observation, the resolution to which a given field of observation can be digitized and, therefore, the degree of discrimination which can be effected. Finally, multiple sensor arrays can also provide a higher aggregate throughput, which translates into an ability to track more agile targets.

Figure 2:
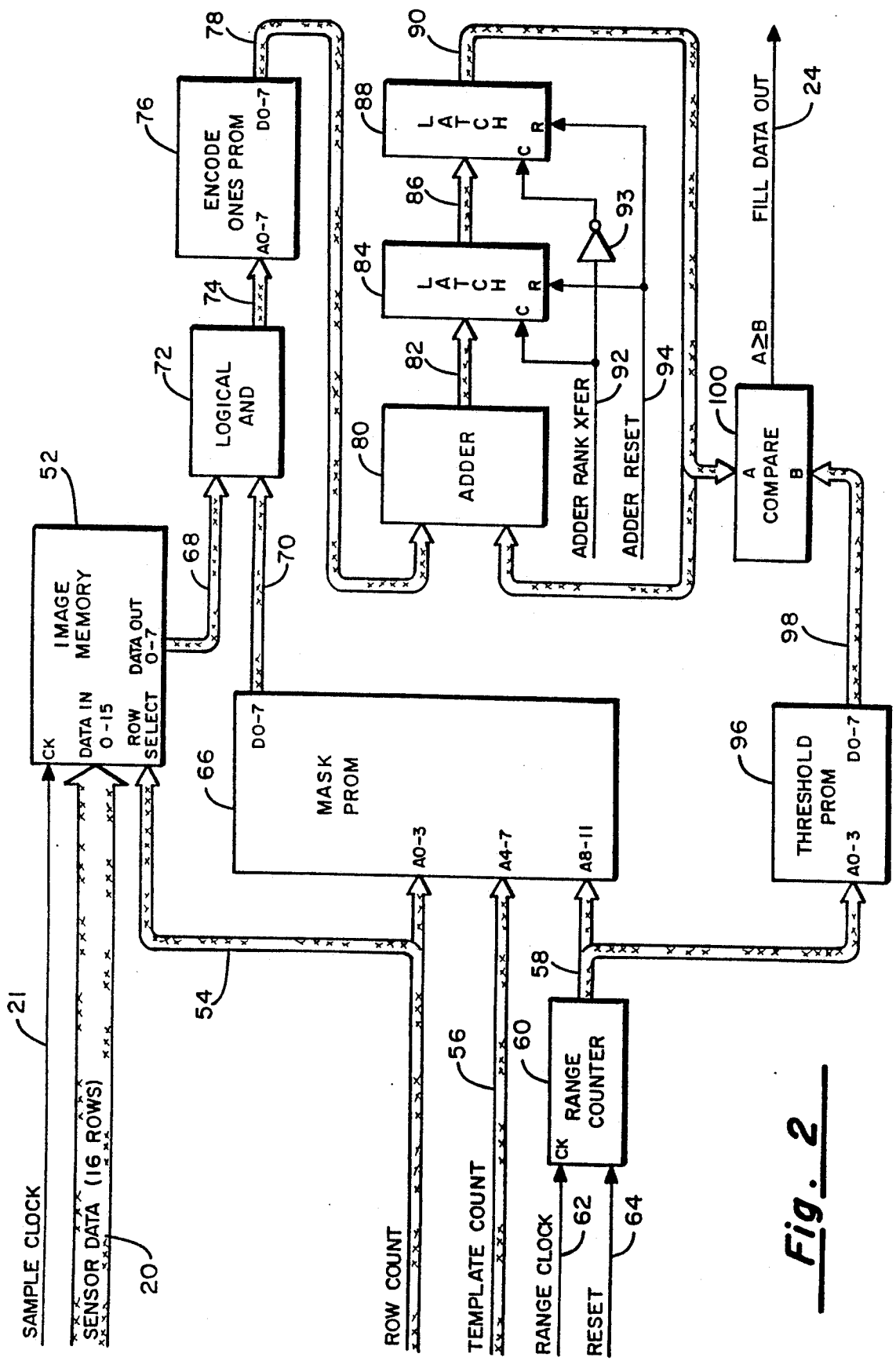
FIG. 2 shows a detailed block diagram of the template matching processor used in the system of FIG. 1.

Referring next to FIG. 2, there is illustrated a detailed block diagram of the template matching processor 22 or 38 in FIG. 1. From the leading edge of sample clock pulse on line 21, a new column of data from sensor data bus 20 is shifted into image memory 52. The steps by which the Fill Data for a single template match occurs will next be described.

At the beginning of each template match operation, adder reset line 94 goes high resetting latches 84 and 88 to clear the adder result latch 84 and 88. Template matching proceeds a row at a time as row count signals from signal conditioner 18 on lines 54 are stepped from 0 through 15. Template match comparisons are performed between the sensor image data stored in image memory 52 and the templates stored in programmable read-only memory (Mask PROM) 66. The Mask PROM 66 may be configured to store 256 templates. For each of sixteen values of range count, the four address bits, 8 through 11, define sixteen sets of templates. Each set of templates contains one for each of the sixteen possible vertical positions. The position is determined by address bits 4 through 7. Comparisons are performed on a row-by-row basis, with address bits 0 through 3 defining the row. Starting at template position row count "0", the 0th row of image memory 52 is selected by means of the row count value on row count bus 54 and bits 0 through 7 corresponding to that row are read out onto bus 68. At the same time row count bus 54 addresses the Mask PROM 66 to read out the corresponding 0th row of template "0" on bus 70. Logical AND 72 performs a bit-by-bit logical AND between the data provided on buses 68 and 70 to produce an output on bus 74 which provides an 8-bit address to the Encode Ones PROM 76. Memory 76 is arranged such that for any of the 256 possible addresses defined by the data on bus 74, the data output to bus 78 corresponds to a digital count of the number of binary "1's" contained in the aforementioned address. For example, if the 0th row of template "0" contained "1's" in bit positions 2, 3 and 4 and the 0th row of the image memory also contained binary "1's" in these same bit positions, the count on bus 78 would be decimal 3. However, if the data in image memory were translated such that the bits occurred in positions 2 and 3, the output on bus 78 would be a count of 2. It can thus be seen that the value of the count on bus 78 will be equal to the number of "1's" in the respective row of the Mask PROM 66 only when an object is precisely registered in the corresponding position of image memory 52.

Adder 80 along with latches 84 and 88 provide a means to accumulate the digital counts appearing on bus 78 as each row of a given template is scanned. Prior to the scan of the 0th row of a given template, the adder reset line 94 is momentarily raised to the "one" state to reset latches 84 and 88 and thus clear out any residual count from a previous template evaluation cycle. The template match counts appearing on bus 78 are accumulated by pulsing adder rank transfer line 92 just prior to advancing the row count on bus 54. The leading edge of the adder rank transfer pulse latches the summation of the counts appearing on buses 78 and 90 into latch 84 while the trailing edge of that same pulse latches this value into latch 88. At the completion of the sixteenth adder rank transfer pulse, the output of latch 88 thus is made to contain a digital count corresponding to the summation of template matches for the entire image memory. Threshold PROM 96 provides the threshold criteria which determines if the summation of all the detected matched pixels for a given template is of a sufficient value to consider the data contained in image memory 52 to correlate with the template stored in Mask PROM 66. For example, the template representative of an object at the most distant range might contain as few as four "1's" whereas the same object at the closest range would have a template containing sixteen "1's". Using a threshold criteria of 50 percent, for example, of the template being filled by the object in image memory, the respective threshold count values would be 2 and 8.

At the completion of the last row scan of a given template, the state of line 24, Fill Data Out, indicates whether the data loaded into image memory 52 satisfies the template match criteria. Specifically, Fill Data Out equals Binary "1" if the summation of all of the template match counts present at the "A" input of the comparator 100 are equal to or greater than the threshold count present at the "B" input of that comparator.

It can be seen that Mask PROM memory 66 can be thought of as a book containing sixteen chapters where the number of each chapter is identified by the address bits 8 through 11. For each chapter, there are sixteen pages which are identified by the address bits 4 through 7. For each page, i.e., template, there are sixteen lines or rows identified by address bits 0 through 3. When all sixteen rows of a given template have been scanned to generate the Fill Data Out signal on line 24 indicative of a match or no-match for that template, the Template Position Count applied via bus 56 is incremented to proceed to the next page of memory, i.e., the next template, where the process is repeated again. When all template position counts 0 through 15 have been evaluated, a total of sixteen data values indicative of each template position have been generated on Fill Data Out line 24.

The outputs of 4-bit range counter 60 appear on output bus 58 and are used to perform the higher order bit, i.e., chapter, selection of the Mask PROM and the corresponding threshold count value from threshold PROM 96. Range counter 60 is reset by means of reset line 64 which clears the counter to all "0's" and is stepped by pulses on range clock line 62. The range clock 62 and the reset 64 are supplied external to this device by circuits which are timed to reflect specific system applications. Typically, a reset 64 is briefly applied at the start of operation and a range clock 62 is applied repeatedly, as required, by system range considerations. This offers the advantage that the range counter, comprised of four bits, is controlled (advanced) by a single range clock line, making it ideal for small systems.

Figure 3A:
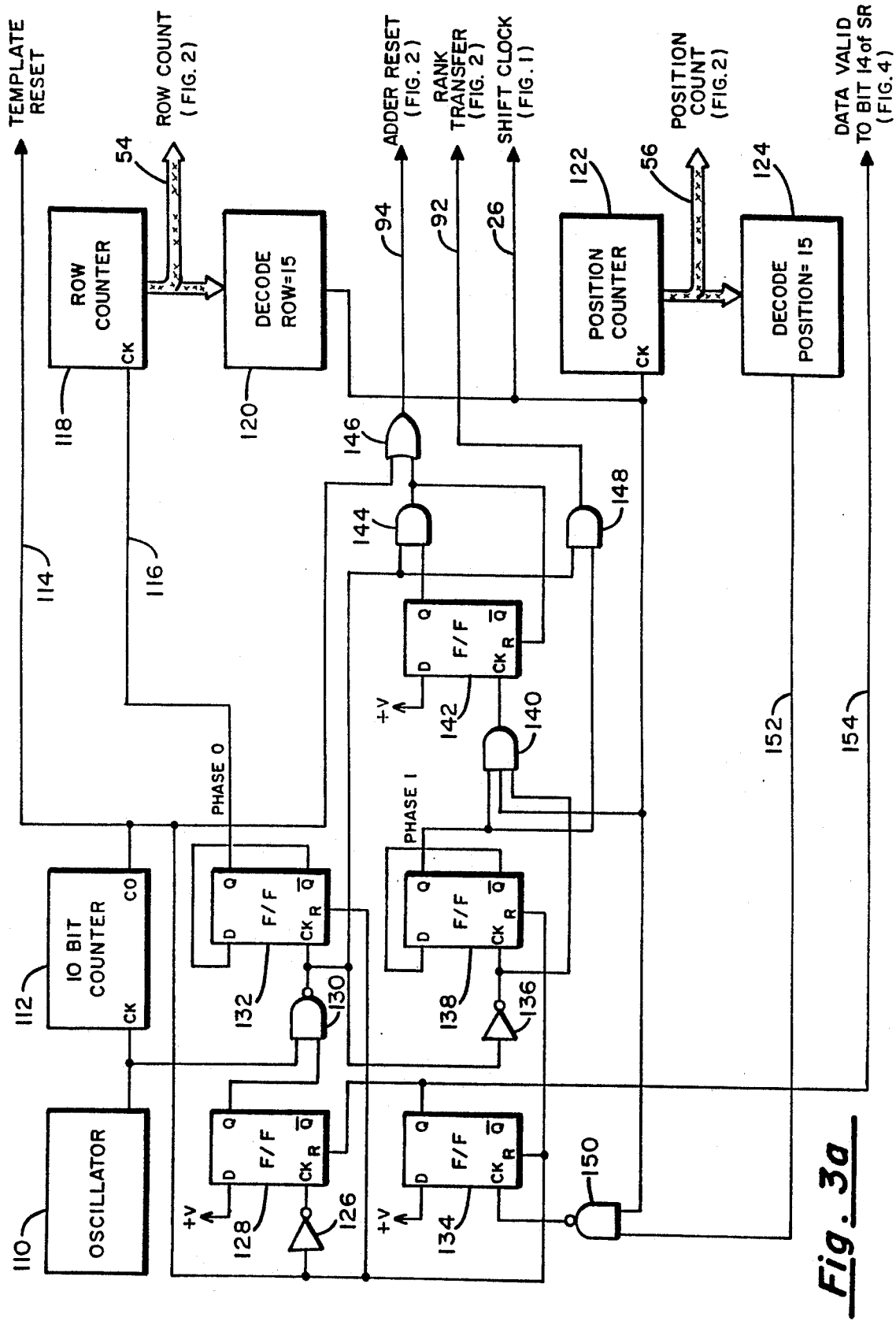
FIG. 3a shows a detailed block diagram of the timing circuitry required to operate the template matching processor.
Figure 3B:
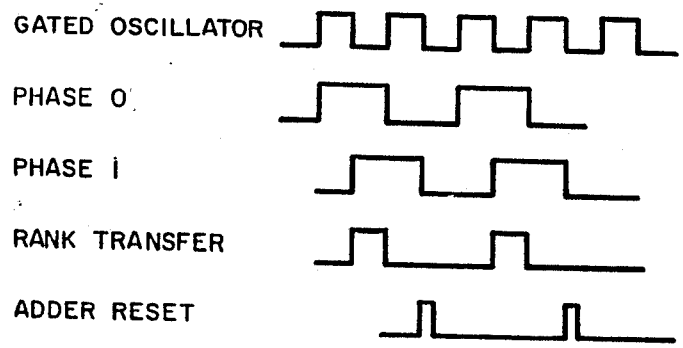

FIG. 3a is a block diagram of the circuitry which provides the timing pulses for the template matching processor of FIG. 2, while FIG. 3b shows the timing waveforms for certain of those timing signals. All timing is derived from a free-running oscillator 110, which in the preferred embodiment, has an interval typically in the one microsecond range. A ten-bit counter 112 frequency divides the output of oscillator 110 by a factor of 1024 to generate the template reset pulses on line 144. A new cycle is started by the trailing edge of the template reset pulse when it clocks flip-flop 128 to the set condition and thus enables NAND gate 130, allowing pulses from oscillator 110 to be propagated to its output. The output of gate 130 is shown in the uppermost line of waveforms in FIG. 3b labeled "gated oscillator". Flip-flop 132 divides the output of NAND gate 130 to generate the signal, "Phase 0", the leading edge of which increments row counter 118. Timing signal "Phase 1" is obtained at the output of flip-flop 138 clocked by inverter 136. AND gate 148 combines the "Phase 1" signal with the "Gated Oscillator" signal to generate the "Rank Transfer" pulse on line 92. Decode circuit 120 generates a logical "1" whenever the output of row counter 118 equals 15, i.e., binary 1111. The output of decoder 120 accomplishes several functions. First, it generates the "Shift Clock" on line 26 to shift Fill Data into the 16-bit shift register 30 of FIG. 1. It also increments the template position counter 122 and finally, it generates the adder reset pulse on line 94 by means of AND gate 140, D-type flip-flop 142, AND gate 144 and OR gate 146. OR gate 146 additionally provides for an Adder Reset pulse coincident with each template reset on line 114.

As previously described, a complete evaluation of the object entered into the image memory of FIG. 2 requires 256 steps, i.e., 16 rows for 16 template positions. As shown in FIG. 3a, when the last row of the last template position has been reached, the outputs of decode circuits 120 and 124 are both "1" and thus the output of NAND gate 150 is low. The leading edge of the next "Phase 0" clock pulse, shown in FIG. 3a, increments the row counter 118, disables NAND gate 150, clocks flip-flop 134 to the set condition and presents a reset to flip-flop 128. The output of flip-flop 128 disables NAND gate 130 to inhibit any further timing pulses and at this point, the circuitry remains static until the next template reset pulse again initiates a scan.

The template reset 114 (FIG. 3a) is timed to occur after all template counts have occurred during one sample clock period 21. It is at this time that the template counter is reset and can begin counting again following occurrence of the next sample clock 21. The template reset occurs at the carry-out of the ten-bit counter 112 and resets the template counter driving the lines 56 in FIG. 2 in order to begin the image scan from the top. This occurs in synchronism with the sample clock, i.e., when the sample clock latches new data into image memory 52 (FIG. 2), it is time to restart the template matching processor.

Figure 4:
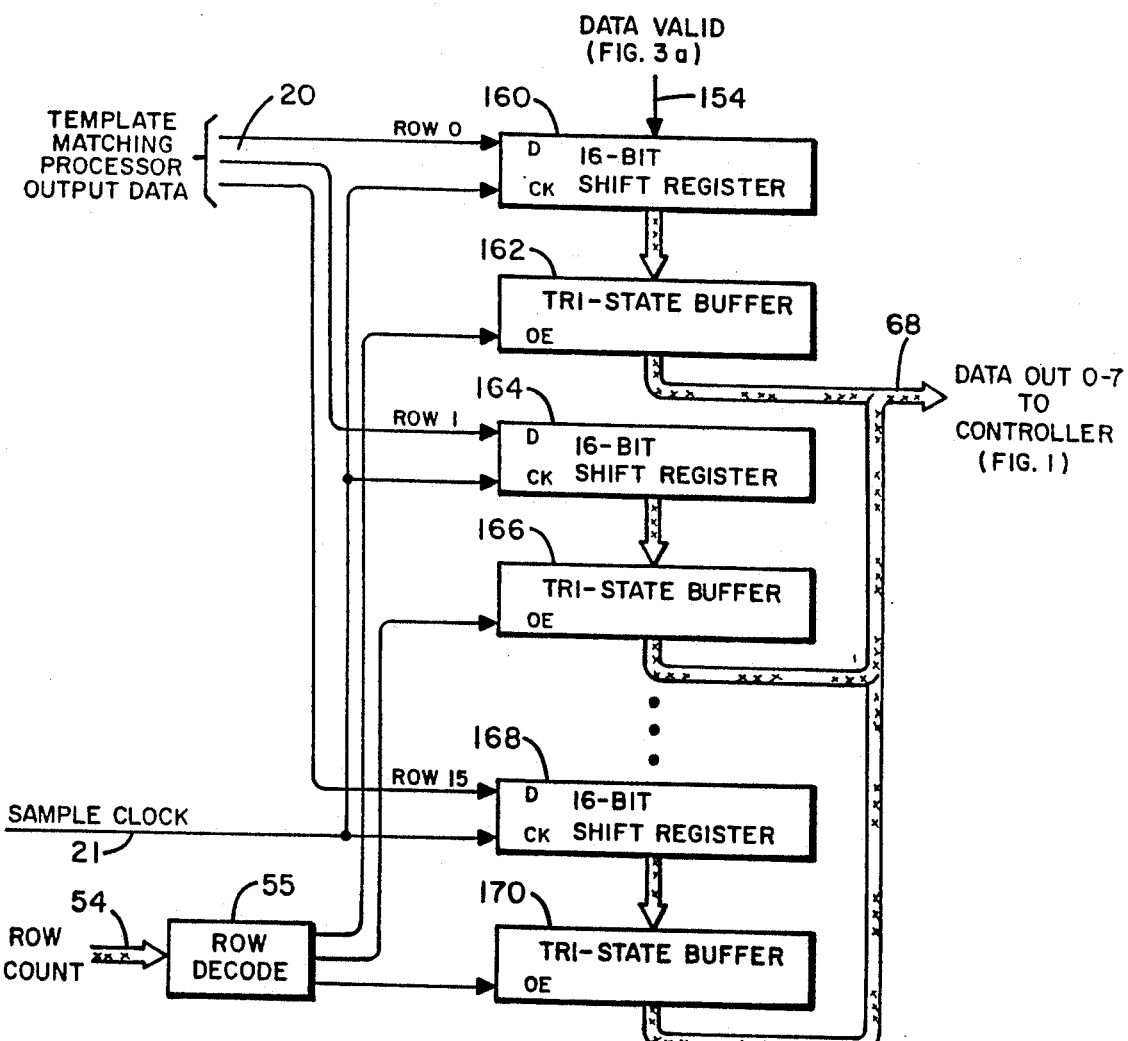
FIG. 4 is a detailed block diagram of the processed image memory output portion of the template matching processor.

The data valid 154 is provided on bit 14 of the shift register and then to the microprocessor via the tri-state buffer 162 on FIG. 4. This data valid bit provides an indication to the microprocessor that the image processing has been completed and the data being read by polling means is now valid and may be used for added processing by the microprocessor. This data valid signal allows the microprocessor to perform other tasks simultaneously to the image processor doing its task such that the software can re-synchronize to the image processor.

Referring now to FIG. 4, it shows a detailed block diagram of the organization of the image memory 52 of FIG. 2. The memory may be comprised of sixteen 16-bit shift registers, identified as shift circuits 160, 164 and 168. The data input of each shift register is connected to one of the data lines of sensor data bus 20. Pulses on sample clock line 21 clocks all sixteen shift registers in parallel to move one 16-bit column of sensor data into image memory for each sample clock pulse. Old data "shifts out" of the registers and is thereby discarded.

Associated with each shift register 160, 164, 168 is a tri-state buffer identified by numerals 162, 166 and 170. They permit selective gating of the parallel outputs of an associated shift register onto data-out bus 68 (FIG. 2). Row decode circuitry 55 selects one of the sixteen tri-state buffers in response to the row count provided by bus 54. The circuitry of FIG. 4 may be implemented using programmable array logic, a Type PAL 16R8 manufactured by Monolithic Memories, Inc. has been found suitable. This PAL typically provides a 4:1 reduction of parts count over the discrete design equivalent. Previously known template matching algorithms have been implemented in discrete logic. The circuit size and gate count of this invention is of small enough size to permit implementation in a gate array. This single die IC, except for the template PROM, shrinks the discrete minimum IC version from about 60 parts requiring 64 square inches of space into a two-part (including template PROM) system requiring about 2.5 square inches of space. In addition, the single IC used for the image processor consumes less than 0.5 milliamps, far less than the discrete minimum part count version requiring about 1.5 amps. This single IC version of the present invention is now feasible with a state-of-the-art gate array comprising about 2240 two-input equivalent NAND gates. For the first time ever, this algorithm can now be put into battery-powered products for which the available power is only about 10 milliamps (not the 1.5 amps required by the prior art discrete version). This same product occupies only about 2 square inches rather than the 64 square inches required by the discrete component version.

Those skilled in the art will recognize that in implementing the invention, memories of different sizes may be employed. Also, the PROM memories 66 and 96 may be replaced with random access memories which can be written to by controller 10.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. Image processing apparatus comprising, in combination:
    (a) electro-optic linear scanning means for simultaneously scanning an object along multiple lines comprising a field-of-view and simultaneously producing a plurality of analog electrical output signals characteristic of said object as observed along said multiple lines, each one of said output signals corresponding to a respective line;
    (b) signal conditioning means coupled to said linear scanning means for simultaneously converting said plurality of analog electrical output signals to a corresponding plurality of digital signal trains;
    (c) template matching processor means including image memory means having parallel data input means, parallel data output means, said image memory means being paritioned into a plurality of N-bit registers each coupled to a respective one of said digital signal trains, and template storage means for storing a plurality of digital signal patterns together defining the ideal two-dimensional shape characteristics of said object, said template storage means including parallel data output means;

(d) controller means coupled to said linear scanning means and said signal conditioning means for selectively establishing the amplitude threshold and sampling frequency for said analog output signals in forming said digital signal trains, said controller means controlling the entry of each said plurality of digital signal trains into said respective plurality of N-bit registers of said image memory means in said template matching processor means for an instantaneous field-of-view;

(e) said template matching processor means further including control means coupled to receive sample clock signals from said signal conditioning means for producing timing signals for said image memory means and said template storage means;

(f) comparator means coupled to said parallel data output means of said image memory means and said template storage means for performing a bit-by-bit logical AND comparison of each of said digital signal trains with a respective one of said digital signal patterns stepped out of the respective N-bit registers of said image memory means and template storage means by said timing signals; and (g) means for summing the result of said logical AND comparison to generate a degree of correlation signal.

2. Image processing apparatus comprising:
(a) a plurality of electro-optical sensing elements arranged in a linear array;
(b) scanning means for focusing electro-magnetic radiation from an object to be identified onto said linear array for simultaneously producing a plurality of analog signals arranged in n-row by m-columns as said scanning means effectively sweeps said object at selectable intervals;
(c) signal conditioning means connected to said sensing elements for simultaneously converting each one of said analog signals into a corresponding M-digital word of N-bits, the number of said M-digital words corresponding to said m-columns being sequentially generated;
(d) controller means operatively coupled to said scanning means and said signal conditioning means for sequencing the formation of said plurality of groups of M-digital words of N-bits each and producing sample clock signals for said image memory means;
(e) template matching processor means including image memory means having a plurality of N-bit shift registers each coupled to said signal conditioning means for sequentially receiving respective N-bit words in parallel format, said template matching processor means further including a ROM memory means storing a plurality of N-bit words characterizing a plurality of templates of M-columns each and control means receiving sample clock signals from said signal conditioning means for producing timing signals for said image memory means and said ROM memory means whereby sais M-digital workds of N-bits each are simultaneously stepped out in parallel from said image memory means and said ROM memory means; and (f) means for accumulating a tally of the number of matches between the binary signaificance of bits comprising the N-bit words being simultaneously stepped from said image memory means and said ROM memory means.

3. The image processing apparatus as in claim 1 wherein said controller means is operatively coupled to more than one of said linear scanning means, signal conditioning means and template matching processor means.

4. The image processing apparatus as in claim 1 wherein said image memory means comprises a plurality of N-bit shift registers coupled to the output of said signal conditioning means, each of said shift registers including said parallel data output means which are individually coupled to tri-state buffering means, and decoder means coupled to receive a row count value from said signal conditioning means, said decoder means having plural output lines individually coupled to said tri-state buffering means for sequentially gating N-bit words from said shift registers to said comparator means.

5. The image processing apparatus as in claim 1 wherein said comparator means comprises a plurality of AND logic circuits, each having first and second inputs for receiving a first N-bit word from said image memory means on said first inputs and a corresponding N-bit word from said template storage means on said second inputs, said AND logic circuits providing address inputs; and ROM encoding means coupled to receive said address inputs from said AND logic circuit means and storing count values at addressable locations therein corresponding to the number of signals in said address inputs of a given binary significance.

6. The image processing apparatus as in claim 5 wherein said means for tallying comprises digital adding means coupled to receive said count values from said ROM encoding means for developing a total of the number of signals of a given binary significance read out from said ROM encoding means.

7. The image processing apparatus as in claim 6 and further including further comparator means for comparing said total of the number of signals of a given binary significance to a predetermined threshold count.

8. The image processing apparatus as in claim 2 wherein said means for accumulating a tally comprises:
(a) N two-input AND gates coupled to the data outputs of said image memory means and said ROM memory for comparing the binary significance of each bit of each word read from said image memory means with the corresponding bits read out from said ROM memory means;
(d) encoding means coupled to the output of said N two-input AND gates for producing a count value corresponding to the number of matches determined by said AND gates for successive N-bit words; and
(c) adding means for summing said count values for M successive N-bit words applied to said N two-input AND gates.

* * * * *